United States Patent
Allen et al.

[11] Patent Number: 6,109,640
[45] Date of Patent: Aug. 29, 2000

[54] WHEELED GOOSENECK ADAPTER FOR STANDARD HITCH TRAILER

[76] Inventors: Donald Allen, 6489 US Highway 160; Donald G. Lien, 6310 County Rd 24, both of Cortez, Colo. 81321

[21] Appl. No.: 09/149,521

[22] Filed: Sep. 8, 1998

[51] Int. Cl.[7] .................................................. B60D 1/14
[52] U.S. Cl. ...................................... 280/417.1; 280/476.1
[58] Field of Search ............................. 280/415.1, 416.1, 280/417.1, 476.1

[56] References Cited

U.S. PATENT DOCUMENTS

| | | | |
|---|---|---|---|
| 3,815,936 | 6/1974 | Oaks, Jr. | 280/417.1 |
| 3,881,749 | 5/1975 | Berends | 280/417.1 |
| 3,889,978 | 6/1975 | Kann | 280/417.1 |
| 4,433,853 | 2/1984 | Swaim | 280/417.1 |
| 5,324,061 | 6/1994 | Lay | 280/417.1 |
| 5,797,614 | 8/1998 | Hord et al. | 280/417.1 |

*Primary Examiner*—Kevin Hurley
*Attorney, Agent, or Firm*—Kenton L. Fruedenberg; Maxwell C. Freudenberg

[57] ABSTRACT

An adapter for converting a tag-along or standard trailer to a gooseneck trailer. The adapter has a main elevated horizontal frame with three principal structures depending therefrom comprising: (1) a forward gooseneck of adjustable vertical length for connection to a gooseneck towing point on a tow vehicle; (2) an intermediate vertical-tension-resisting rectangular frame carrying a hitch ball to be received in a ball-hitch coupler of the standard trailer, and small light-weight retractable or removable wheels with pneumatic tires providing manual mobility of the adapter by a single person, with its weight balanced over the wheels, between the standard trailer and a parked adapter position when the adapter is disconnected from the trailer; and (3) a rear vertical-compression-resisting rectangular frame having a vertically adjustable horizontal beam member which spans, rests atop, and is secured to, upper surfaces of trailer tongue members extending rearwardly divergently from the trailer ball-hitch coupler. The intermediate and rear frames in combination with the elevated main horizontal frame define a cage structure which may be suitably enclosed as an additional storage space.

20 Claims, 7 Drawing Sheets

WHEELED GOOSENECK ADAPTER FOR STANDARD HITCH TRAILER

BACKGROUND OF THE INVENTION

Trailers which are towed behind motor vehicles for any of number of purposes include, cargo trailers, boat trailers horse trailers, camping trailers, house trailers and mobile homes. Virtually all such trailers are one of two types which are distinguished by the method used to connect them to the tow vehicle. A "gooseneck" or "fifth wheel" trailer is attached to a hitch point over the center of the rear axle, most commonly located in the center of the bed of a pickup truck. A standard or "tag-along" trailer uses a more universal point of attachment which includes a hitch ball located low and at the rear of the tow vehicle and anchored to the frame or bumper. While gooseneck type trailers are generally considered to have more desirable towing characteristics, not all vehicles are capable of accommodating a gooseneck trailer and most trailers are designed to be towed using a standard hitch. Accordingly, the present invention provides a standard-to-gooseneck adapter for attaching a standard hitch trailer to a tow vehicle having a gooseneck hitch capability and provides a pair of retractable wheels located at approximately the balance point or center of gravity of the device for relative ease of handling of the adapter during its installation onto and removal from a trailer.

Detachable gooseneck adapters are found in the following U.S. Pat. Nos.: 3,810,661, 3,840,252, 3,889,978, 4,832,358, and 3,881,749. Only the last listed patent shows an adapter with wheeled mobility, but its removable wheels are at its rearmost end, far from its center of gravity, and when detached the adapter is certainly not suitable for facile positioning and installation or removal at the hands of a single person.

SUMMARY OF THE INVENTION

Since the majority of trailers are of "standard" hitch design, while a gooseneck design is often thought to provide better towing characteristics, the present invention allows the benefits of gooseneck towing to be achieved with a standard hitch trailer while providing a gooseneck adapter device which may be readily moved from one standard trailer to another.

Often a gooseneck trailer hitch located in the bed of a pickup is unavailable due to the bed being in use for carrying cargo or being enclosed with a camper shell or "topper," such as might be common during winter weather. Using the adapter of the present invention allows a standard hitch trailer to be selectably towed using either a gooseneck coupling when the bed hitch is available or using a standard coupling when use of the bed hitch is not practical.

The present invention also allows a trailer such as a mobile home to be towed as a gooseneck trailer without having the gooseneck hardware permanently attached to the trailer. This allows the trailer to be produced at less expense and avoids the unnecessary additional structure which may be unsightly when the trailer is in place in a semi-permanent location.

Additionally, the position of the wheels of the present invention is such that the device may be readily balanced on the wheels so that it may be rolled and manually maneuvered by a single individual.

The wheels of the of the present invention may also allow the device with its wheels extended to their roadable positions to be towed by itself behind a tow vehicle.

It is an object of the present invention to provide an improved means of attaching a standard hitch trailer to a tow vehicle having a gooseneck hitch capability.

It is an object of the present invention to provide an improved removable means of attaching a standard hitch trailer to a tow vehicle having a gooseneck hitch capability.

It is another object of the present invention to provide a means of attaching a standard hitch trailer to a tow vehicle having a gooseneck hitch capability while providing additional volume for cargo.

It is another object of the present invention to provide an easily and independently transportable adapter for use in towing a standard hitch trailer as a gooseneck trailer.

It is another object of the present invention to provide a portable gooseneck adapter for adjusted attachment to any of a variety of standard hitch trailers which enables facile positioning and installation or removal of the adapter with only the hands of a single person using only simple hand tools.

It is another object of the present invention to provide a standard-to-gooseneck trailer adapter which is fitted with retractable wheels to be readily moved and manually handled by one person for connection and disconnection relative to a standard trailer.

It is another object of the present invention to provide a standard-to-gooseneck trailer adapter having balanced wheeled mobility and which may be towed by a vehicle without being attached to a trailer.

DETAILED DESCRIPTION OF THE INVENTION

Figure 1:
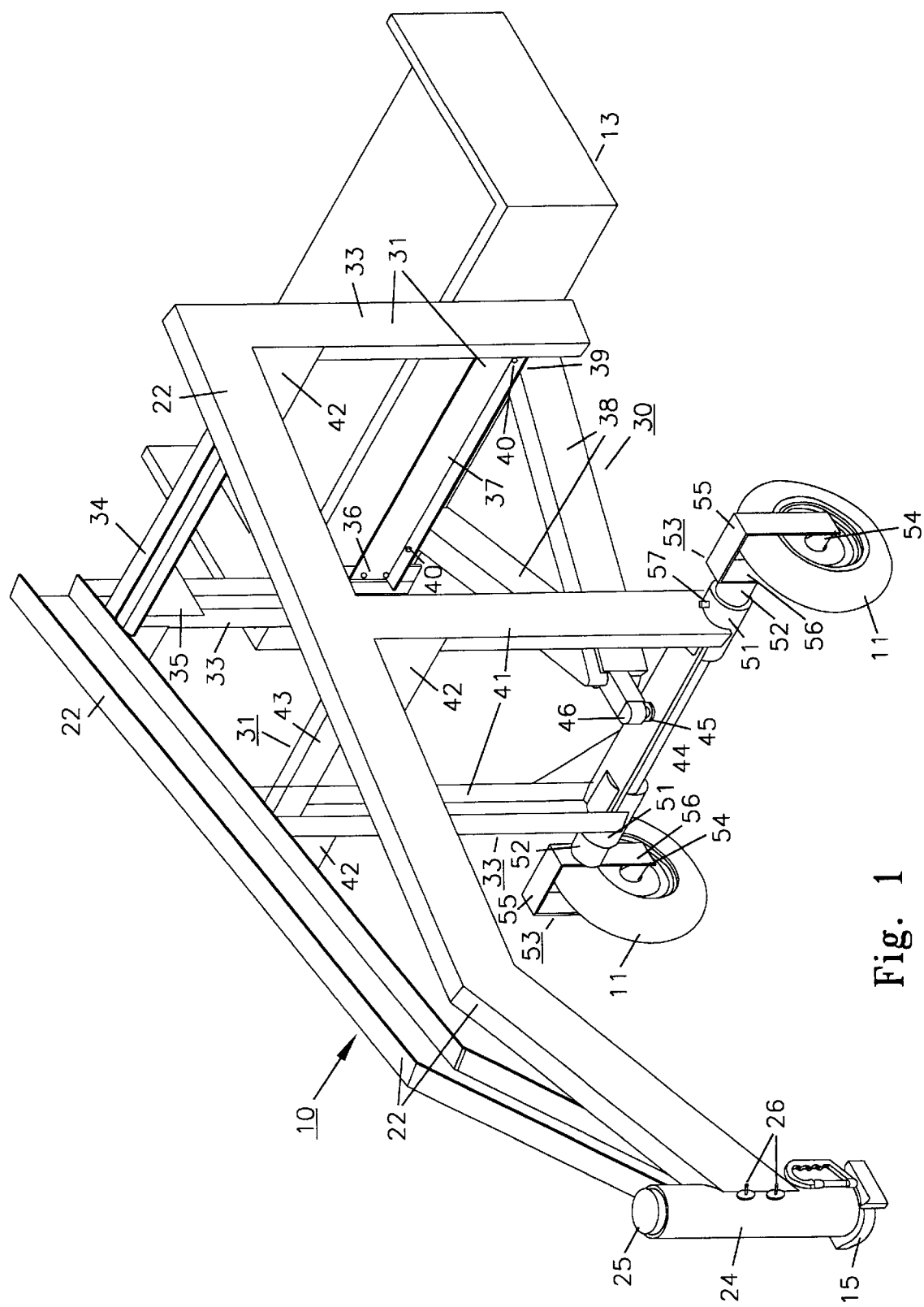
FIG. 1 is a perspective view of the adapter of the preferred embodiment attached to a conventional hitch trailer prior to retraction or removal of the wheels.
Figure 2:
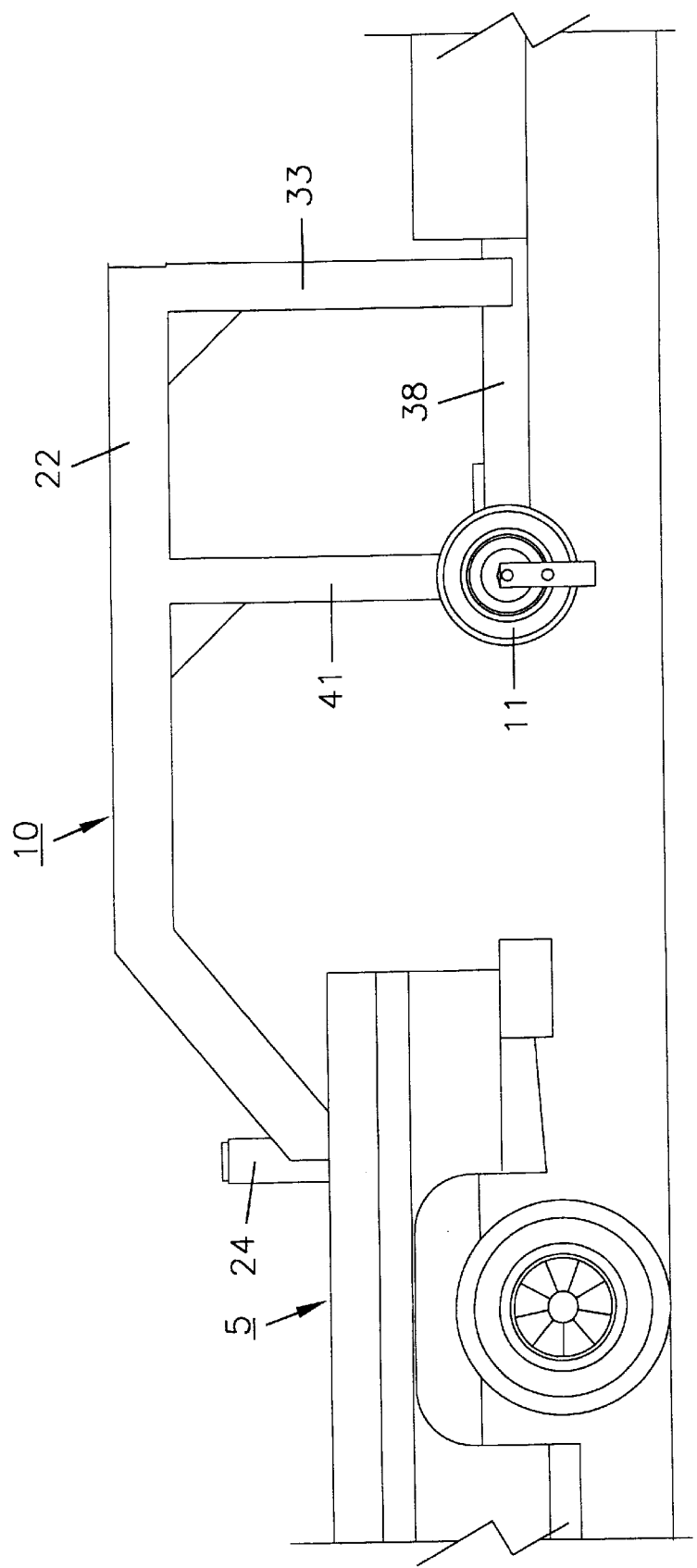
FIG. 2 is a side view of the adapter of the preferred embodiment with wheels retracted and connected to a pickup truck for towing.
Figure 3:
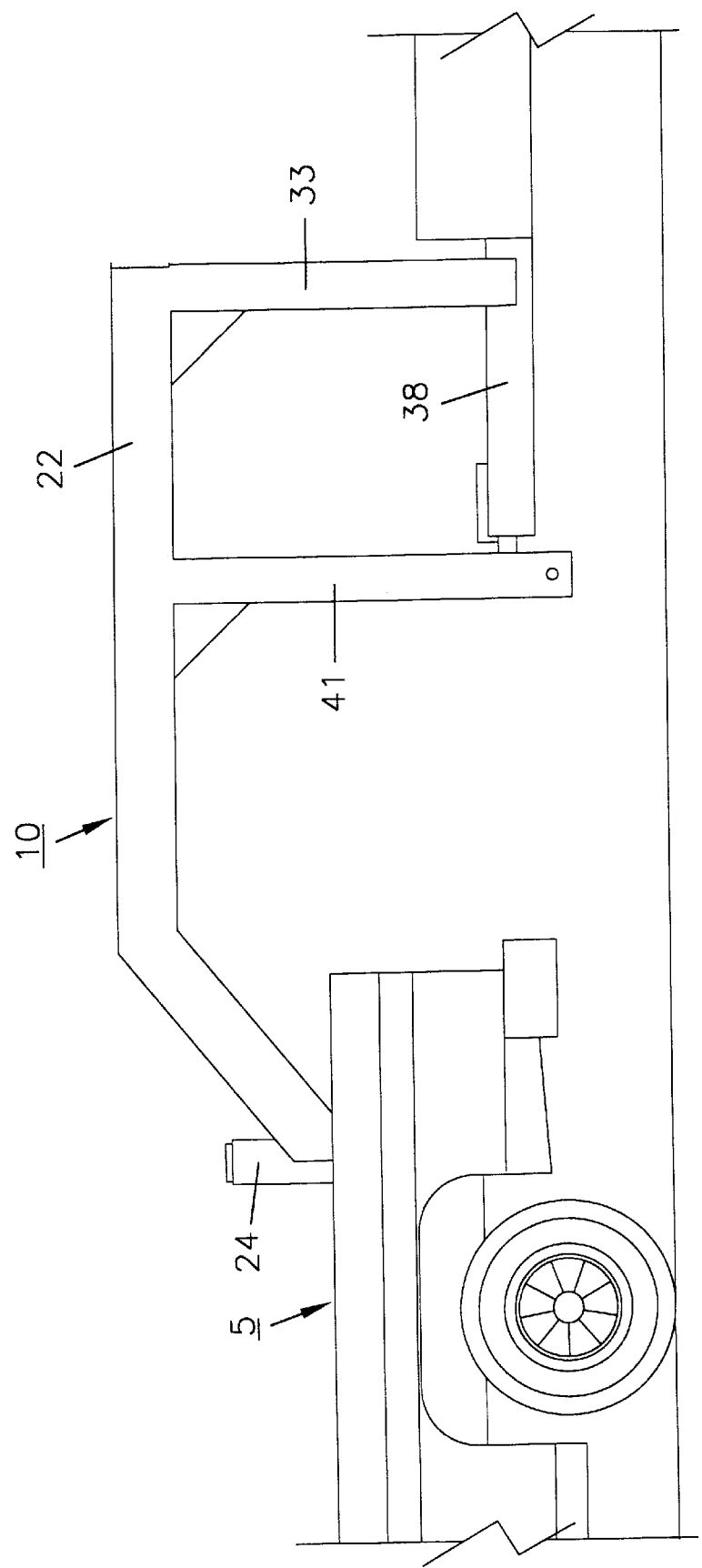
FIG. 3 is a side view of the adapter of the preferred embodiment with wheels removed and connected to a pickup truck tow vehicle.
Figure 4:
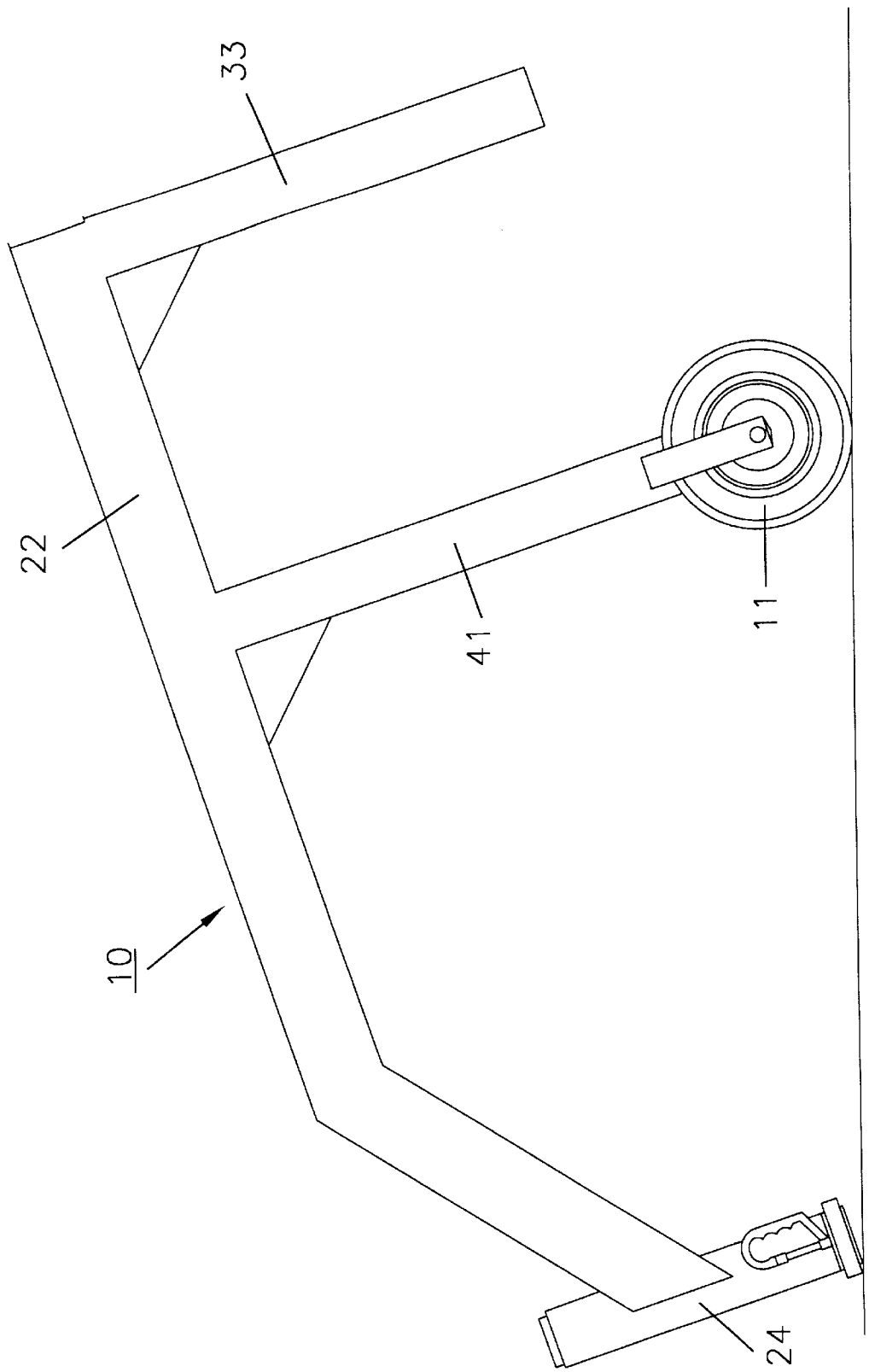
FIG. 4 is a side view of the adapter of the preferred embodiment alone, detached from both the trailer and tow vehicle and resting on its wheels and coupling head.

A portable gooseneck adapter structure 10 with retractable or removable wheels 11 with pneumatic tires is shown in FIGS. 1–3 secured to a conventional tag-along trailer 13 to convert the trailer 13 to a gooseneck towing configuration. The gooseneck adapter structure 10 includes a conventional gooseneck coupling head 15 for releasable latching the adapter 10 to a conventional coupling ball (not shown) in the bed of a pickup truck 5 used to tow the gooseneck-modified trailer 13.

Throughout this description the term transverse is used only to refer to a horizontal direction perpendicular to the direction of travel when the gooseneck-modified trailer 13 is being towed.

The adapter 10 has an overlying generally horizontal elevated main frame portion 20 about 120 inches long comprising a pair of forwardly convergent beam members 22 of 6 inch steel channels. A short 27 inch length of the forward ends of these beams 22 are angled downwardly at about 23 degrees and these forward ends are secured to a vertical cylindrical sleeve 24 in which a vertical tube 25, carrying the coupling head 15 at its lower end, is adjustably positioned and anchored by a pair of heavy duty set screws 26 in the wall of the sleeve 24.

Approximately one third (longitudinally) of the rear end of the adapter 10 is a cage structure 30 defined by a rearmost vertical transversely extending, vertically-adjustable, vertical-compression-resisting rectangular frame 31, approximately 46 inches wide×48 inches high, in a plane generally perpendicular to the direction of vehicle travel, and a 32.5×48 inch vertical transversely extending rigid vertical-tension-resisting apertured intermediate rectangular frame 32 which is generally in a plane parallel to frame 31. These frames 31 and 32 are secured to the under sides of and depend in parallel vertical planes from the beam members 22. The bottom of the cage 30 is closed by components of the tongue of the trailer 13 to which the frames 31 and 32 are removably secured in a manner to be described.

The rear frame structure 31 has a pair of vertical inwardly-open channel legs 33 depending from the beams 22. The tops of the legs 33 and the ends of the beams 22 are rigidly interconnected by a transversely extending horizontal channel member 34 with appropriate mutually perpendicular reinforcing gussets 35. Similar longitudinal reinforcing gussetts 42' extend between the tops of the legs 33 and the ends of the beams 22. The forward flanges at the lower ends of the channel legs 33 carry fixed plate members 36 with respective rows of holes providing means enabling vertical adjustment of a transverse horizontal beam member 37 of L-shaped section having its vertical web portion adjustably bolted to the plate members 36 to appropriately position its lower horizontal flange portion with each of its two transversely spaced ends as a vertically adjustable foot portion to rest atop, bear down on and be connected to a respective one of the top flat surfaces of rearwardly diverging tongue members 38 of the trailer 13. Both transverse and vertical movement of the beam member 37 relative to these tongue members 38 is resisted by angle brackets 39 having flanges to which the lower flange of the beam 37 and the vertical walls of tongue members are secured. Typically the brackets 39 may be welded to the tongue members 38 and bolted to the lower flange of beam 37 using bolts 40. Of course, vertical movement of beam member 37 relative to the tongue members is also resisted during towing by the forces causing the beam member 37 to bear down on the tongue members 38.

The forward frame structure 32 has a pair of vertical inwardly-open channel legs 41 depending from the beams 22. The tops of the legs 41 and longitudinally intermediate portions of the beams 22 are rigidly interconnected and reinforced with appropriate longitudinally-extending reinforcing gussets 42. A transversely extending horizontal channel member 43 rigidly interconnects the beams 22 and legs 41 at the top of frame structure 32. At the lower bottom portion of the apertured intermediate frame structure 32 the legs 41 are rigidly interconnected by a transverse beam 44 having a flat top surface on which is centrally secured an upwardly extending hitch ball 45 of a size appropriate to fit a ball coupling 46 secured to the forward end of the tongue of trailer 13. Beam 44 and legs 41 are mutually reinforced by interconnecting gussets 47.

At opposite sides of the cage structure 30 and extending outwardly transversely at the lower end of frame 32 are a pair of cylindrical sleeves 51 providing means for rotatably and coaxially supporting cantilevered wheel-adjustment axles 52 of respective wheel-repositioning assemblies 53. The assemblies 53 each carry one of the wheels 11 for rotation on axles 54 parallel to and equally eccentrically spaced from axles 52. The adapter weighs only a few hundred pounds and accordingly the wheels 11 may be small and of light weight and for non-highway use may even have sleeve bearings. The assemblies 53 each comprise a U-shaped frame 55 with opposite ends of the wheel axle 54 secured in flat blade-like ends of the legs of the U-shape frame 55. The base and outer leg of the U-shaped frame 55 form a rigid unitary L-shaped portion of the frame 55 connected by a bolted bracket at the inner corner of the U-shaped frame 55 to the inner leg 56 of the frame 55. This connection is separable to facilitate removal of the wheel 11 from the frame 55 for servicing.

Each axle 52 is fixed to the inner leg 56 of the respective frame 55 at a location thereon such that when the wheel carrying assembly and its frame 55 is swung or rotated from its extended or roadable position to raise the wheel and lock it in a retracted position, the ground clearance for the wheel 11 and the frame 55 is sufficient for towing operations.

Figure 5:
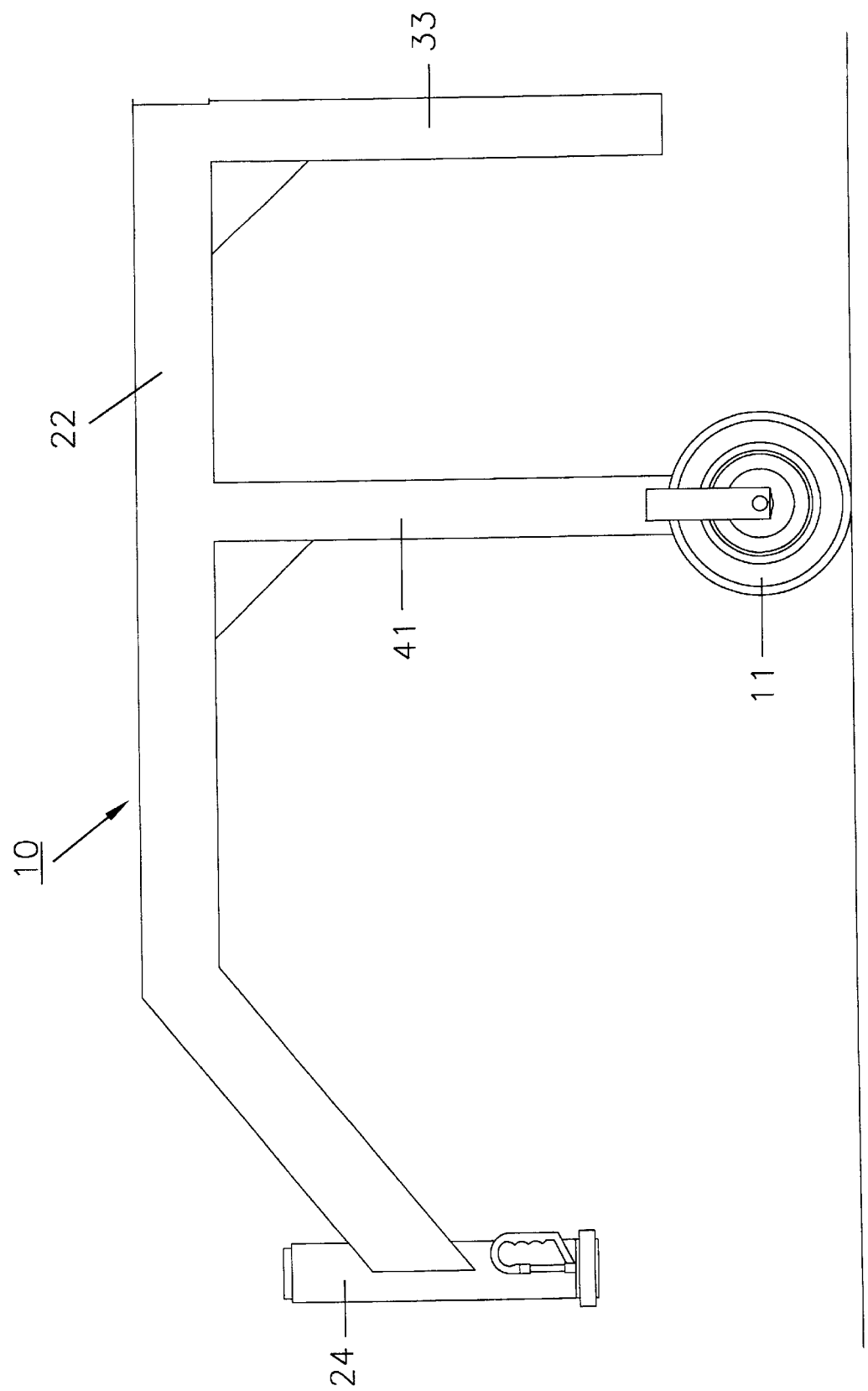
FIG. 5 is a side view of the adapter of the preferred embodiment alone, detached from both the trailer and two vehicle and balanced on its wheels for movement by an individual.

Each axle 52 can be locked in two positions with the wheel in a lowermost extended position for rolling on the ground as shown in FIG. 5, or in an upper retracted position a shown in FIG. 2. This is preferably achieved by means of a single removable self-holding pin or bolt fastening means 57 extending diametrically through the sleeve 51 and the axle 52 to provide two 180° opposite selectable axle positions. For towing, the user has the option of either moving the wheel-positioning assemblies 53 to their retracted-wheel positions or, in the alternative, removing the wheels by completely removing both of the assemblies 55 from the adapter 10 after connecting the adapter 10 to convert the tag-along trailer 13 to a gooseneck configuration as seen in FIG. 3.

The center of gravity of the adapter 10 is preferably in a transverse vertical plane through the axes of the wheel axles 54 when the wheels are in their extended positions and the main frame portion 20 is essentially horizontal. In this condition one person can readily move a detached adapter on its wheels with its entire weight balanced on the wheels as shown in FIG. 5. Because the vertical tube 25 carrying the coupling head 15 is farther from this vertical plane than any other portion of the adapter, the human load is minimized when carrying this forward end of the adapter during wheeled movement of the adapter to a parked position. In the event cargo such as tack or the like is carried on suitable supports in the cage structure 30 any significant shift in the center of gravity of the wheeled adapter balance for manual mobility may be restored by adjusting or shifting the position of the pin 57 to another set of holes in sleeve 51 to move the adapter-balancing roadable position of each wheel slightly rearwardly. When parking the adapter the adapter can be selectively tipped from its balanced position in either direction whereby either the lower portion of the rear rectangular frame 31 or the forward gooseneck would drop by gravity to a stable position resting on the ground or other temporary support when the adapter is no longer manually supported.

Figure 6:
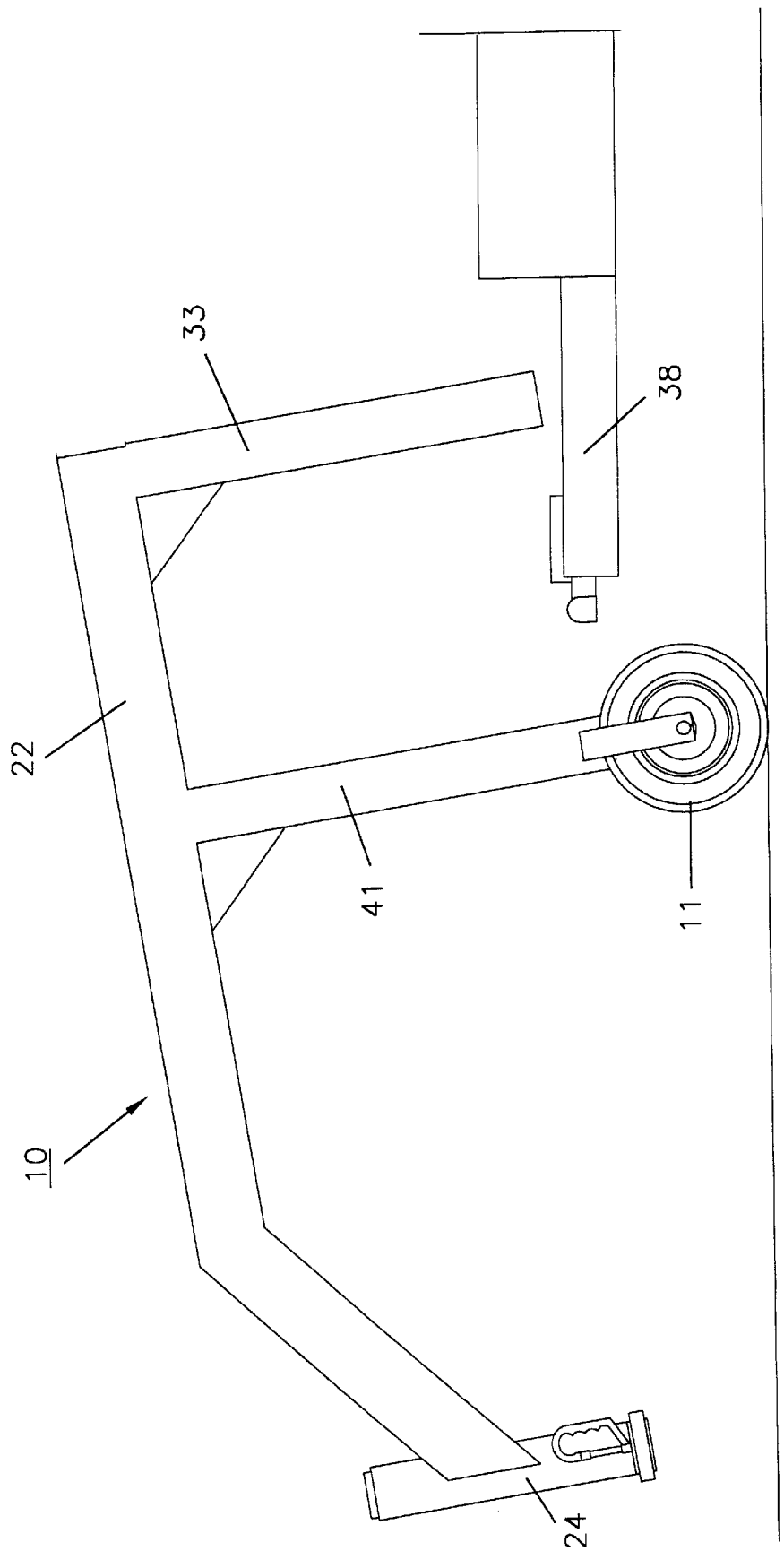
FIG. 6 is a side view of the adapter of the preferred embodiment being rolled into position for connection to a trailer.
Figure 7:
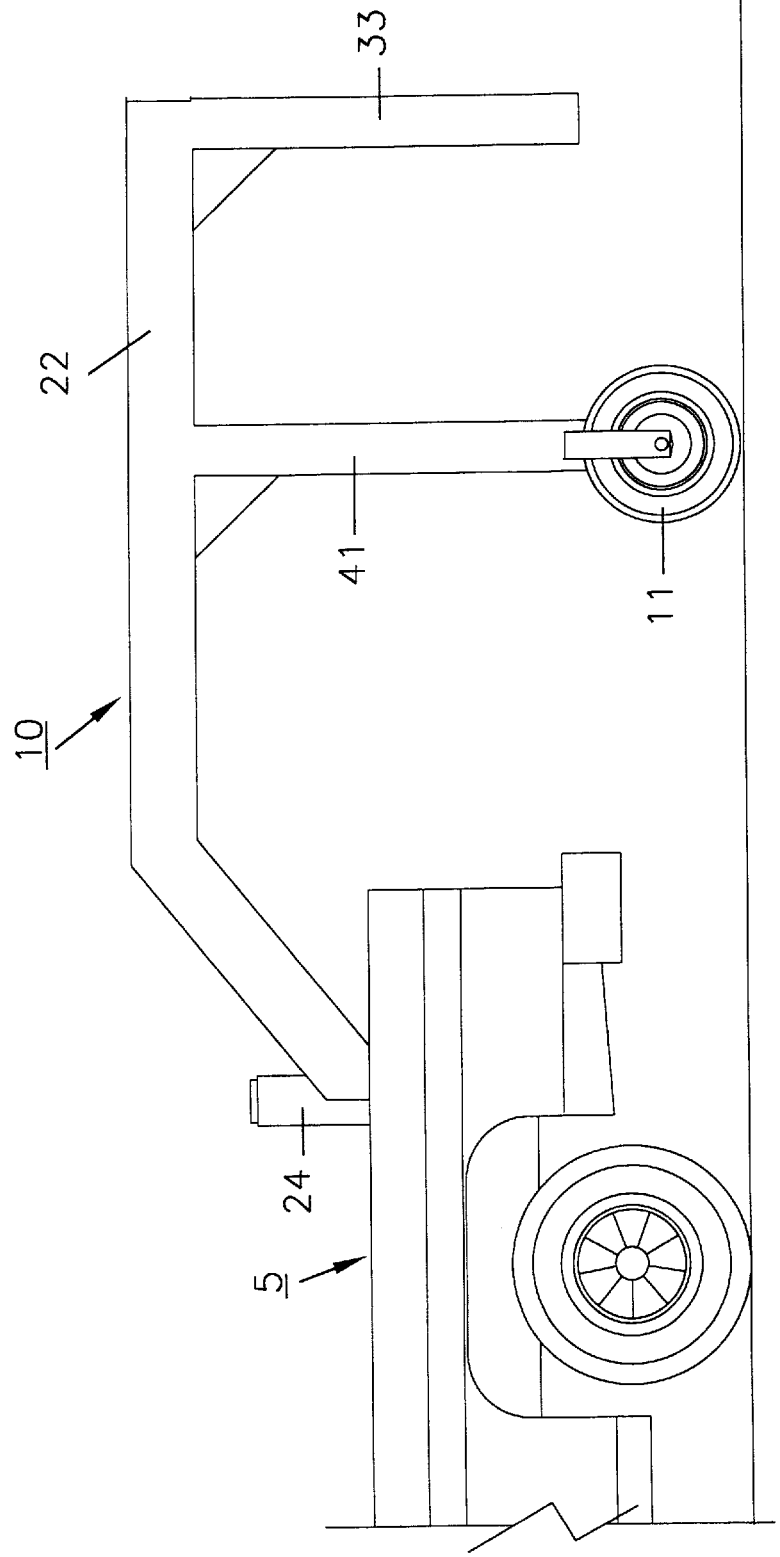
FIG. 7 is a side view of the adapter of the preferred embodiment with as it could be towed by a vehicle without being attached to a trailer.

To attach the adapter 10 to the tongue of trailer 13, the trailer tongue is elevated by a conventional jack 60, shown in FIG. 6, to a position in which the trailer ball coupling 46 has sufficient height to clear the hitch ball 45 on the adapter as the adapter is wheeled to an attaching position. If the beam member 37 at the lower end of the rear frame 31 is removed or made with an arched configuration providing a structure means for keeping the transversely spaced end foot portions of the beam 37 extending inwardly from the respective legs 33 connected but horizontally separated, the adapter 10 can be wheeled directly rearwardly to its attachment position, even when being moved by a tow vehicle, without interference by the jack 60 which extends higher than the upper flat surfaces of the trailer tongue members 38. Alternatively, the forward gooseneck portion of adapter 10 may be manipulated during wheeling to swing the rear frame 31 around or over the jack 60 to the attachment position.

Upon positioning the adapter 10 in its attachment position, the jack 60 is used to lower the coupling 46 onto the ball 45 where it is locked to the ball. Thereafter the jack 60 is used to at first raise the adapter off the ground for retraction of the wheels 11. After wheel retraction the jack is used to level the trailer to the preferred towing orientation relative to the ground. The adapter is then pivoted on the ball 45 to a position in which the rear frame 31 is essentially vertical and perpendicular to the upper surfaces of tongue members 38 and the lower beam member 37 of rear frame 31 is adjusted into contact with the tongue members 38 and bolted to the plates 36. Finally, the vertical tube 25 is adjusted in the sleeve 24 so that, when the coupling head 15 is connected to a gooseneck coupling ball (not shown) of a tow vehicle, the trailer 13 will assume its preferred towing position relative to the ground.

Although lowest cost in manufacture is likely to be achieved by the described use of steel channel members for the principal components, lighter weight is achievable using aluminum components.

Other variations within the scope of this invention will be apparent from the described embodiment and it is intended that the present descriptions be illustrative of the inventive features encompassed by the appended claims.

What is claimed is:

1. An adapter for converting to a gooseneck trailer a standard tag-along trailer having a ball-hitch coupler and horizontal tongue members extending rearwardly divergently from the coupler, the adapter including a main elevated horizontal frame with three principal structures rigidly secured to and depending from the horizontal frame and comprising:
   (1) a forward gooseneck structure of adjustable vertical length with a coupling for connection to a gooseneck towing point on a tow vehicle;
   (2) an intermediate vertical-tension-resisting rigid frame structure carrying a hitch ball to be received in the ball-hitch coupler of the standard trailer and having two transversely separated upper outer corners rigidly secured respectively to two transversely separated members of said horizontal frame; and
   (3) a rear vertical-compression-resisting rigid frame structure having a vertically adjustable horizontally extending structure means which can span, rest atop, and be secured to, upper surfaces of the trailer tongue members extending rearwardly divergently from the trailer ball-hitch coupler.

2. A trailer conversion adapter according to claim 1 wherein said intermediate frame structure is an apertured frame structure having a lower transverse beam carrying said hitch ball.

3. A trailer conversion adapter according to claim 2 wherein said intermediate frame is rectangular.

4. A trailer conversion adapter according to claim 1 wherein said rear frame structure includes two transversely spaced vertically adjustable foot portions for resting atop and connection to respective tongue members of the tag-along trailer.

5. A trailer conversion adapter according to claim 1 wherein said rear frame structure is rectangular.

6. A trailer conversion adapter according to claim 1 wherein said main elevated horizontal frame includes two horizontal rearwardly divergent frame members and each of the intermediate and rear frame structures is a rectangular structure depending from said two divergent frame members of the main elevated horizontal frame.

7. A adapter for converting to a gooseneck trailer a standard tag-along trailer having a ball-hitch coupler and horizontal tongue members extending rearwardly divergently from the coupler, the adapter including a main elevated horizontal frame with three principal structures depending from the horizontal frame and comprising:
   (1) a forward gooseneck structure of adjustable vertical length with a coupling for connection to a gooseneck towing point on a tow vehicle;
   (2) an intermediate vertical-tension-resisting frame structure carrying a hitch ball to be received in the ball-hitch coupler of the standard trailer, and also carrying means supporting retractable wheels which upon protraction enable manual mobility of the adapter by a single person between the standard trailer and a parked adapter position when the adapter is disconnected from the trailer; and
   (3) a rear vertical-compression-resisting frame structure having a vertically adjustable horizontal beam structure with means by which it can span, rest atop, and be secured to, upper surfaces of the trailer tongue members extending rearwardly divergently from the trailer ball-hitch coupler.

8. A trailer conversion adapter according to claim 7 wherein during manual mobility of the adapter the center of gravity is over the axis of rotation of said wheels to balance the adapter an provide minimum load on a person moving the adapter.

9. A trailer conversion adapter according to claim 7 including a separate wheel carrying assembly at each side of the adapter on the intermediate frame.

10. A trailer conversion adapter according to claim 9 including means enabling removal of each wheel from the adapter during towing of a tag-along trailer converted by the adapter as a gooseneck trailer.

11. A trailer conversion adapter according to claim 9 including wheel-retracting means for each wheel carrying assembly enabling retraction of each wheel to a retracted position on the adapter during towing of a tag-along trailer converted by the adapter as a gooseneck trailer.

12. A trailer conversion adapter according to claim 11 wherein each wheel retracting means includes means for rotating the respective wheel carrying assembly about a transverse axis parallel to and offset relative to the axis of rotation of the respective wheel.

13. A trailer conversion adapter according to claim 11 wherein each wheel retracting means includes means for swinging the respective wheel carrying assembly from a roadable position to a retracted position.

14. A gooseneck adapter for a tag-along trailer having a ball coupler at the front end of a trailer tongue with two horizontal tongue members diverging rearwardly from the ball coupler, said adapter comprising:

a gooseneck coupling head for connection to a gooseneck towing point of a tow vehicle, a gantry frame structure extending upwardly and rearwardly from said coupling head, said frame structure having two upper main beams extending along opposite sides of the frame structure, said frame structure having intermediate and rear transverse beams interconnecting said two upper main beams, said frame structure having a pair of tension resisting structural members vertically depending from said main beams at opposite sides of the frame structure at a longitudinally intermediate location of the frame structure, said frame structure having a pair of compression resisting structural members vertically depending from said main beams at opposite sides of the frame structure at the rear of the structure, a transverse structure interconnecting lower ends of the tension resisting structural members and carrying a hitch ball for coupling to the ball coupler of the tag-along trailer, vertically adjustable means near the lower end of said compression resisting structural members to bear against the tops of and be secured to respective tongue members of the tag-along trailer.

15. A trailer conversion adapter according to claim 14 including retractable wheel carrying means supported by the lower ends of said tension resisting structural members with wheels selectably movable between extended roadable positions and retracted positions.

16. A trailer conversion adapter according to claim 15 wherein when the wheels are in said roadable positions the adapter's center of gravity is so located that the adapter can be manually moved with its weight balanced above the wheels.

17. A trailer conversion adapter according to claim 15 including for each wheel a vertically swingable wheel retracting means.

18. An trailer conversion adapter according to claim 17 including means for locking each wheel retracting means in roadable wheel and retracted wheel positions.

19. A trailer conversion adapter according to claim 14 wherein said main beams, said intermediate and rear transverse beams, and said structural members are straight channel members.

20. A trailer conversion adapter according to claim 19 wherein said channel members are steel.

\* \* \* \* \*